(12) United States Patent
Ehmann et al.

(10) Patent No.: US 10,921,874 B2
(45) Date of Patent: *Feb. 16, 2021

(54) HARDWARE-BASED OPERATING POINT CONTROLLER FOR CIRCUIT REGIONS IN AN INTEGRATED CIRCUIT

(71) Applicant: FACEBOOK TECHNOLOGIES, LLC, Menlo Park, CA (US)

(72) Inventors: Gregory Ehmann, Sleepy Hollow, IL (US); Drew E. Wingard, Palo Alto, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 15/912,934

(22) Filed: Mar. 6, 2018

(65) Prior Publication Data
US 2018/0260017 A1    Sep. 13, 2018

Related U.S. Application Data

(60) Provisional application No. 62/467,617, filed on Mar. 6, 2017.

(51) Int. Cl.
*G06F 1/32* (2019.01)
*G06F 1/3287* (2019.01)
(Continued)

(52) U.S. Cl.
CPC ............ *G06F 1/3287* (2013.01); *G06F 1/324* (2013.01); *G06F 1/3228* (2013.01); *G06F 1/3237* (2013.01); *G06F 1/3296* (2013.01)

(58) Field of Classification Search
CPC ...... G06F 1/3206; G06F 1/324; G06F 1/3296; G06F 1/206; G06F 1/3287
See application file for complete search history.

(56) References Cited

U.S. PATENT DOCUMENTS

| 4,189,767 A | 2/1980 | Ahuja |
| 5,708,659 A | 1/1998 | Rostoker et al. |

(Continued)

FOREIGN PATENT DOCUMENTS

WO    2011127128 A1    10/2011

OTHER PUBLICATIONS

EP18764833.2, "Extended European Search Report", dated Feb. 14, 2020, 10 pages.

(Continued)

*Primary Examiner* — Albert Wang
(74) *Attorney, Agent, or Firm* — Weaver Austin Villeneuve & Sampson LLP

(57) ABSTRACT

In an embodiment, an operating point controller for two or more circuit regions in an integrated circuit is discussed. The OPC is configured to both i) set a resource state, including operating voltage and operating frequency, for each of those circuit regions, and ii) identify events to initiate transitions between two or more operating points for a given circuit region. The operating point controller is also configured to manage transitions between operating points for the two or more circuit regions on the integrated circuit. The operating point controller is a hardware based machine implemented in logic rather than software operating on a CPU processor.

20 Claims, 11 Drawing Sheets power domain controller & operating point controller communication

(51) Int. Cl.
    *G06F 1/3228*    (2019.01)
    *G06F 1/324*     (2019.01)
    *G06F 1/3296*    (2019.01)
    *G06F 1/3237*    (2019.01)

(56) References Cited

U.S. PATENT DOCUMENTS

| | | | |
|---|---|---|---|
| 5,781,918 | A | 7/1998 | Lieberman et al. |
| 5,860,159 | A | 1/1999 | Hagersten |
| 6,229,723 | B1 | 5/2001 | Umetsu et al. |
| 6,487,621 | B1 | 11/2002 | MacLaren |
| 7,120,765 | B2 | 10/2006 | Dodd et al. |
| 7,155,554 | B2 | 12/2006 | Vinogradov et al. |
| 7,194,561 | B2 | 3/2007 | Weber |
| 7,243,264 | B2 | 7/2007 | Weber et al. |
| 7,552,292 | B2 | 6/2009 | Hsieh et al. |
| 7,574,629 | B2 | 8/2009 | Douady et al. |
| 7,590,815 | B1 | 9/2009 | De Waal |
| 7,598,726 | B1 | 10/2009 | Tabatabaei |
| 7,680,988 | B1 | 3/2010 | Nickolls et al. |
| 7,818,497 | B2 | 10/2010 | Gower et al. |
| 8,020,124 | B2 | 9/2011 | Alexanian et al. |
| 8,032,329 | B2 | 10/2011 | Chou et al. |
| 8,073,820 | B2 | 12/2011 | Srinivasan et al. |
| 8,108,648 | B2 | 1/2012 | Srinivasan et al. |
| 8,190,804 | B1 | 5/2012 | Srinivasan et al. |
| 8,438,306 | B2 | 5/2013 | De Lescure et al. |
| 8,484,397 | B1 | 7/2013 | Srinivasan et al. |
| 8,514,889 | B2 | 8/2013 | Jayasimha et al. |
| 8,601,288 | B2 | 12/2013 | Brinks et al. |
| 8,668,941 | B2 | 3/2014 | Kim |
| 8,711,867 | B2 | 4/2014 | Guo et al. |
| 8,798,038 | B2 | 8/2014 | Jayasimha et al. |
| 8,972,995 | B2 | 3/2015 | Srinivasan et al. |
| 9,292,436 | B2 | 3/2016 | Wingard et al. |
| 9,405,700 | B2 | 8/2016 | Wingard |
| 9,495,290 | B2 | 11/2016 | Wingard et al. |
| 9,910,454 | B2 | 3/2018 | Bainbridge et al. |
| 2002/0083256 | A1 | 6/2002 | Pannell |
| 2003/0088721 | A1 | 5/2003 | Sharma |
| 2003/0208553 | A1 | 11/2003 | Wingard et al. |
| 2004/0010652 | A1 | 1/2004 | Adams et al. |
| 2005/0076125 | A1 | 4/2005 | Weber et al. |
| 2005/0086412 | A1 | 4/2005 | Douady et al. |
| 2005/0096970 | A1 | 5/2005 | Weber |
| 2005/0117589 | A1 | 6/2005 | Douady et al. |
| 2005/0141505 | A1 | 6/2005 | Douady et al. |
| 2005/0157717 | A1 | 7/2005 | Douady et al. |
| 2005/0210325 | A1 | 9/2005 | Douady et al. |
| 2006/0047890 | A1 | 3/2006 | Van De Waerdt |
| 2007/0038791 | A1 | 2/2007 | Subramanian et al. |
| 2007/0110052 | A1 | 5/2007 | Kok et al. |
| 2007/0266350 | A1 | 11/2007 | Fulga et al. |
| 2008/0028090 | A1 | 1/2008 | Kok et al. |
| 2008/0235421 | A1 | 9/2008 | Jayaratnam et al. |
| 2008/0320254 | A1 | 12/2008 | Wingard et al. |
| 2009/0042594 | A1 | 2/2009 | Yavuz et al. |
| 2010/0095137 | A1 | 4/2010 | Bieswanger et al. |
| 2011/0095803 | A1 | 4/2011 | Meijer et al. |
| 2012/0054511 | A1 | 3/2012 | Brinks et al. |
| 2013/0073878 | A1 | 3/2013 | Jayasimha et al. |
| 2013/0311796 | A1 | 11/2013 | Brinks et al. |
| 2014/0380071 | A1* | 12/2014 | Lee .................. G06F 1/3296 713/321 |
| 2016/0188501 | A1 | 6/2016 | Chan et al. |
| 2016/0363985 | A1 | 12/2016 | Ehmann et al. |

OTHER PUBLICATIONS

PCT/US2018/021076, "International Preliminary Report on Patentability", dated Sep. 19, 2019, 13 pages.

PCT/US2018/021076, "International Search Report and Written Opinion", dated May 21, 2018, 13 pages.

\* cited by examiner

Figure 1: power domain controller & operating point controller communication

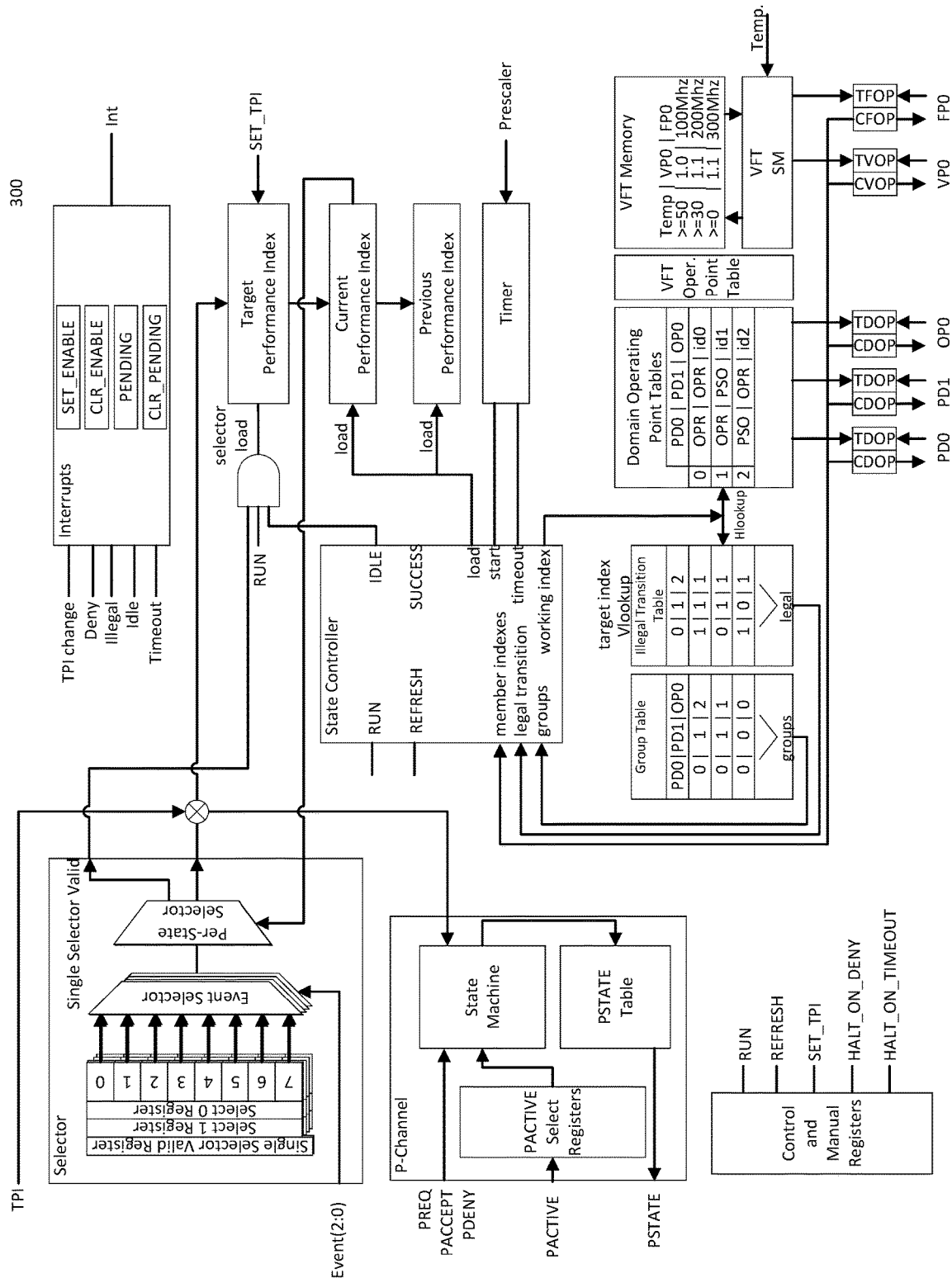
Figure 3 operating point controller

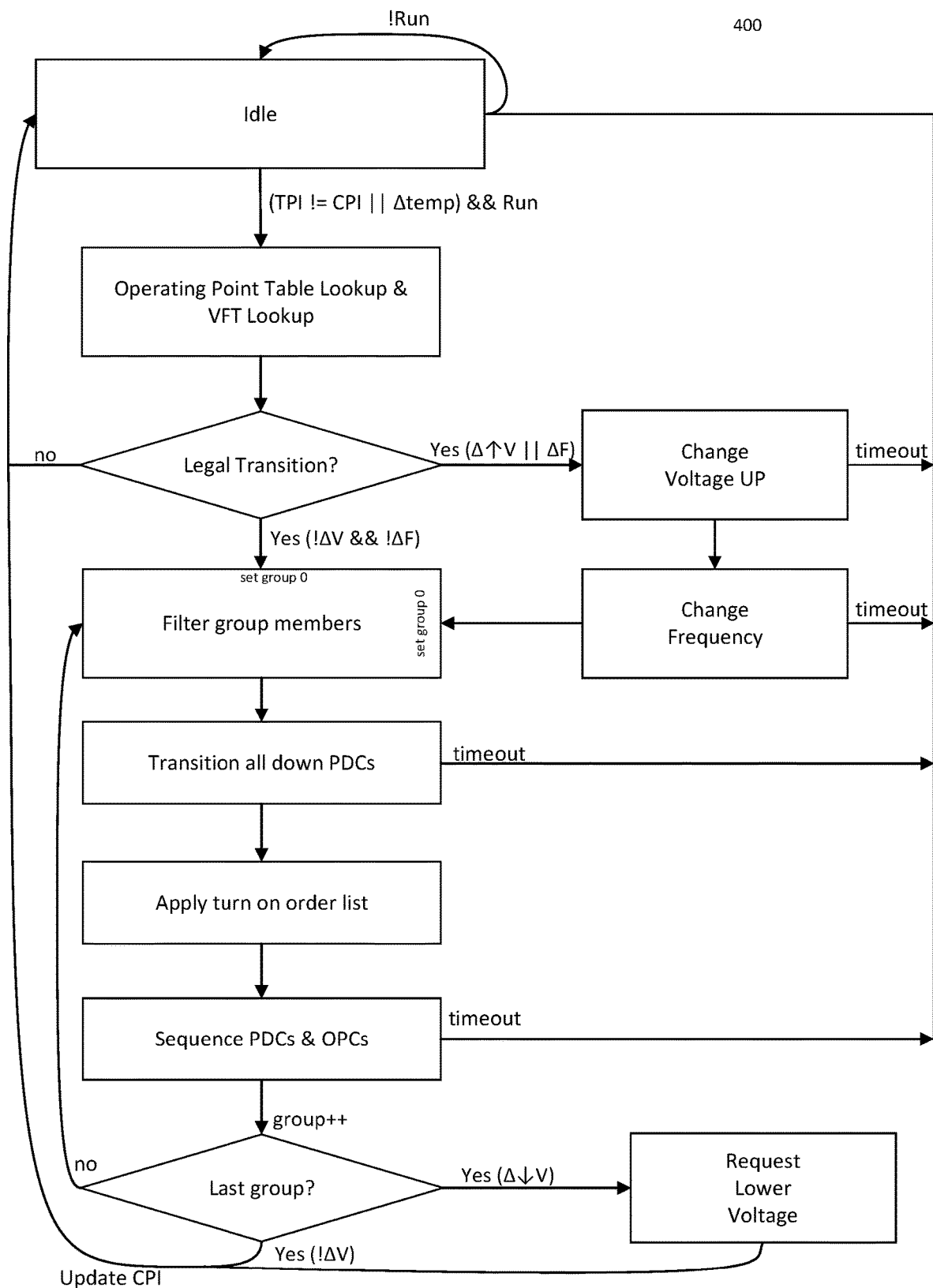
Figure 4: OPC State Machine

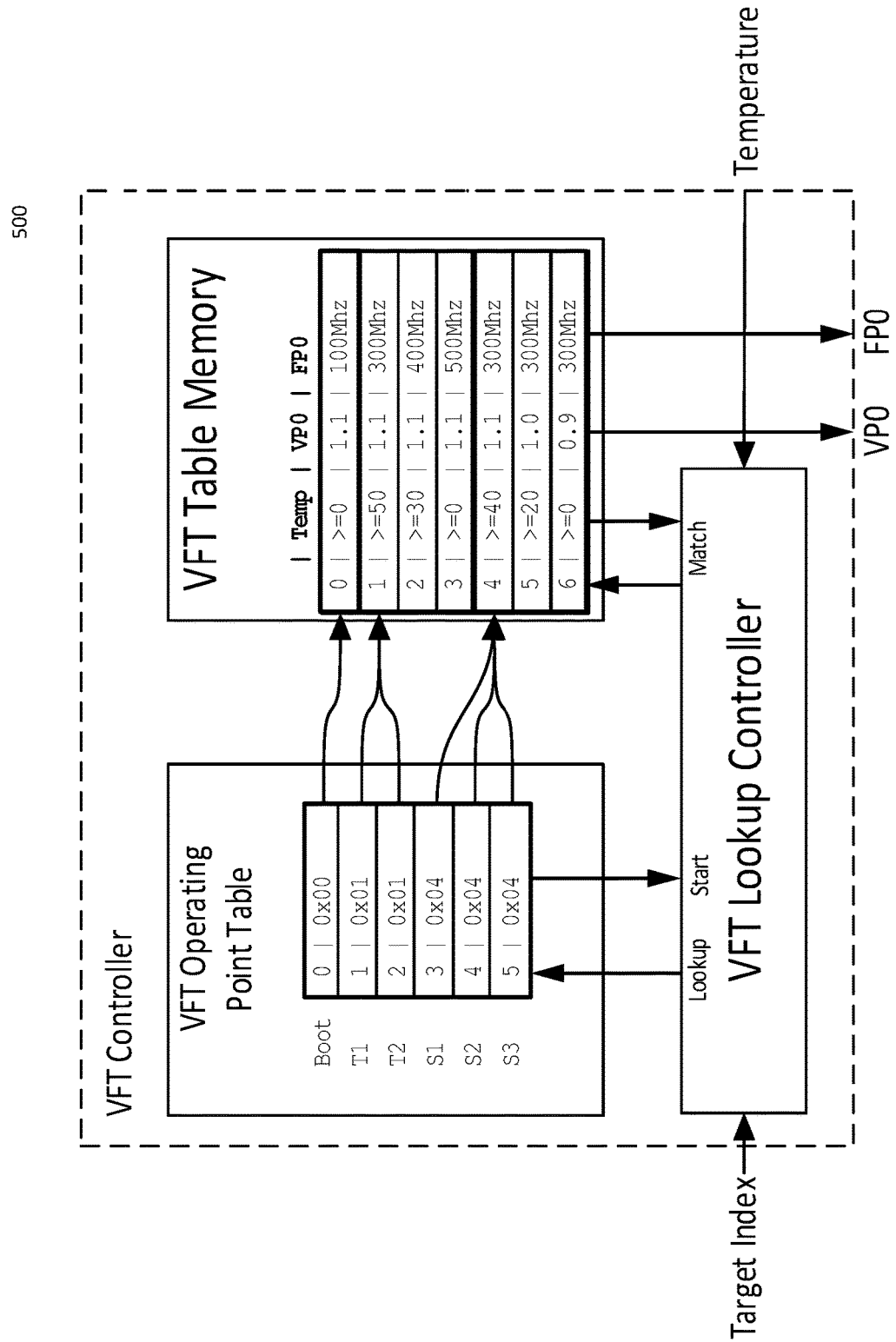
Figure 5: Voltage, Frequency, Temperature Controller

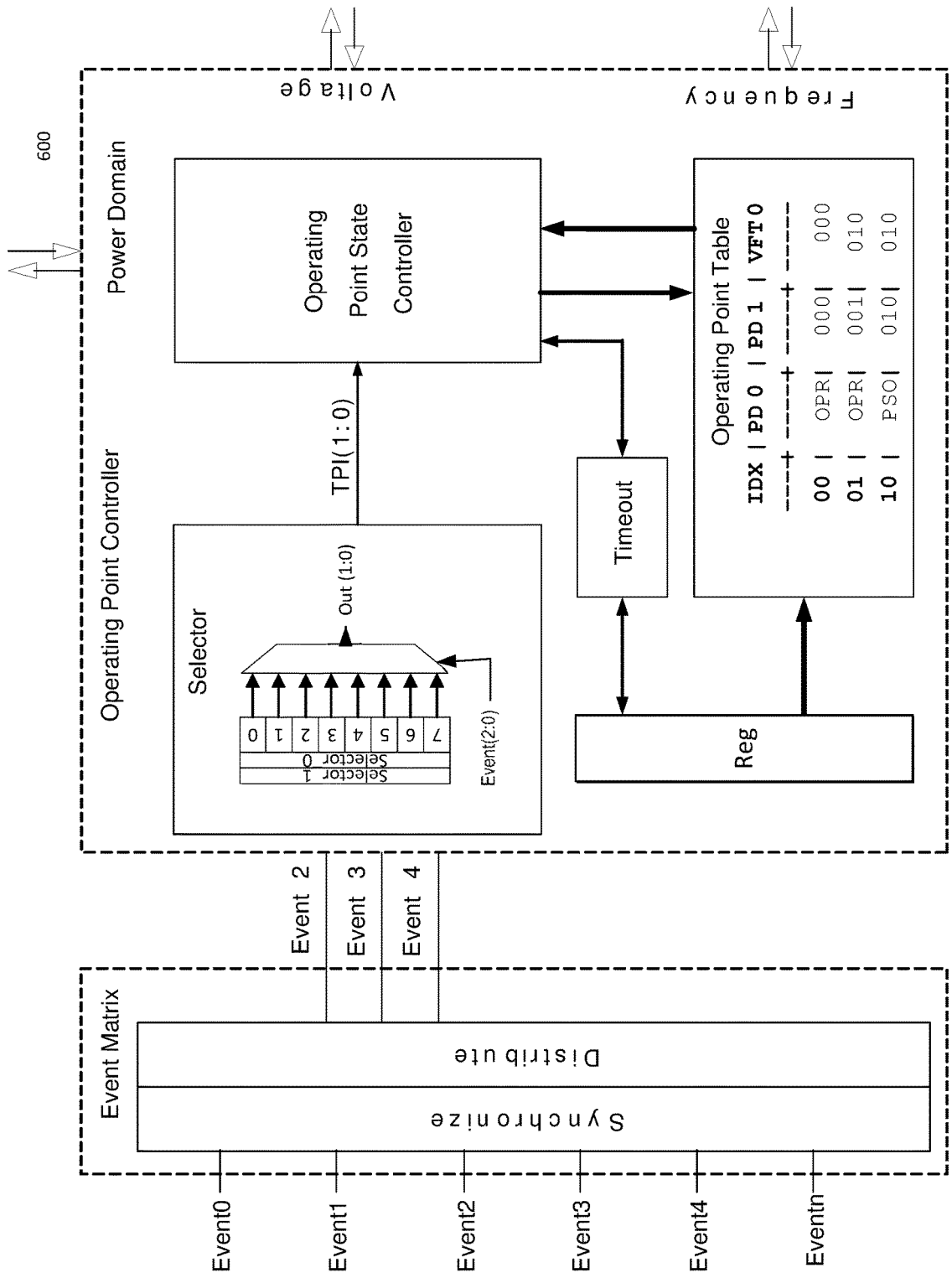
Figure 6: Operating point event matrix

| Operating Point | PD0 | PD1 | PD2 | Comment |
|---|---|---|---|---|
| High | OPR (1.1v 500Mhz) | OPR/CSO | OPR/CSO | All on |
| Medium | OPR (1.1v 500Mhz) | OPR | PSO | |
| Low | OPR (0.8v 100 Mhz) | PSO | PSO | Reduced clock and voltage on PD0 |
| Off | PSO | PSO | PSO | All off |

Figure 7: operating point table

| Bits | Name | Range | R/W | Exp | Ret | Description |
|---|---|---|---|---|---|---|
| 1 | Busy15 | 1-0 | ro | n | n | Member is busy in a transition |
| 2 | DPI15 | Full | ro | n | n | Domain 15 performance index |
| 3 | Busy14 | 1-0 | ro | n | n | Member is busy in a transition |
| 4 | DPI14 | Full | ro | n | n | Domain 14 performance index |
| 4 | Busy13 | 1-0 | ro | n | n | Member is busy in a transition |
| 6 | DPI13 | Full | ro | n | n | Domain 13 performance index |
| 7 | Busy12 | 1-0 | ro | n | n | Member is busy in a transition |
| 8 | DPI12 | Full | ro | n | n | Domain 12 performance index |
| 9 | Busy11 | 1-0 | ro | n | n | Member is busy in a transition |
| 10 | DPI11 | Full | ro | n | n | Domain 1 performance index |

Figure 8 OPC Register for Domain Operating Point

| | State Name | Cpu0 | Cpu1 | Cpu2 | Cpu3 | Voltage/Frequency |
|---|---|---|---|---|---|---|
| 1 | OFF | PSO | PSO | PSO | PSO | OFF |
| 2 | NORMAL | OPR,PSO | OPR,PSO | OPR,PSO | OPR,PSO | NORM |
| 3 | TURBO | OPR,PSO | OPR,PSO | OPR,PSO | OPR,PSO | TURBO |

Fig. 9B: Example Table with independent per-CPU gating state control

| | State Name | Cpu0 | Cpu1 | Cpu2 | Cpu3 | Voltage/Frequency |
|---|---|---|---|---|---|---|
| 2 | NORMAL_0000 | PSO | PSO | PSO | PSO | NORM |
| 3 | NORMAL_0001 | PSO | PSO | PSO | OPR | NORM |
| 4 | NORMAL_0010 | PSO | PSO | OPR | PSO | NORM |
| 5 | NORMAL_0011 | PSO | PSO | OPR | OPR | NORM |
| 6 | NORMAL_0100 | PSO | OPR | PSO | PSO | NORM |
| 7 | NORMAL_0101 | PSO | OPR | PSO | OPR | NORM |
| 8 | NORMAL_0110 | PSO | OPR | OPR | PSO | NORM |
| 9 | NORMAL_0111 | PSO | OPR | OPR | OPR | NORM |
| 10 | NORMAL_1000 | OPR | PSO | PSO | PSO | NORM |
| 11 | NORMAL_1001 | OPR | PSO | PSO | OPR | NORM |
| 12 | NORMAL_1010 | OPR | PSO | OPR | PSO | NORM |
| 13 | NORMAL_1011 | OPR | PSO | OPR | OPR | NORM |
| 14 | NORMAL_1100 | OPR | OPR | PSO | PSO | NORM |
| 15 | NORMAL_1101 | OPR | OPR | PSO | OPR | NORM |
| 16 | NORMAL_1110 | OPR | OPR | OPR | PSO | NORM |
| 17 | NORMAL_1111 | OPR | OPR | OPR | OPR | NORM |

Fig. 9C Expanded table with states

HARDWARE-BASED OPERATING POINT CONTROLLER FOR CIRCUIT REGIONS IN AN INTEGRATED CIRCUIT

RELATED APPLICATION

This application incorporates, in its entirety, U.S. provisional patent application Ser. No. 62/467,617, titled 'An Operating Point Controller (OPC) for power domains in an integrated circuit,' filed Mar. 6, 2017, the disclosure of which is incorporated herein by reference in its entirety.

NOTICE OF COPYRIGHT

A portion of the disclosure of this patent document contains material that is subject to copyright protection. The copyright owner has no objection to the facsimile reproduction by anyone of the interconnect as it appears in the Patent and Trademark Office Patent file or records, but otherwise reserves all copyright rights whatsoever.

BACKGROUND

A System-on-a-Chip design may have a need for lower power consumption, multiple clock domains, and multiple power domains. These domains enable power reduction by switching off local supplies to eliminate leakage current, dynamically scaling voltages and clocks (especially in processing subsystems such as Central Processing Units (CPUs), Graphic Processing Units (GPUs), and video engines) to optimize active power for operating conditions and altering IP core clocks to meet the needs of application usage scenarios. Nonetheless, the integrated-circuit-system-power-manager turns different functional blocks on and off to achieve some of the above functions, the communications network between different functional block is typically left powered on while these other functional blocks are put into a sleep mode or idle state. However, room for improvement in this field exists.

SUMMARY

In an embodiment, a method and system are discussed for an Operating Point Controller (OPC) for circuit regions, such as power domains, in an integrated circuit.

In an embodiment, an operating point controller for two or more circuit regions in an integrated circuit is discussed. The OPC is configured to both i) set a resource state, including operating voltage and operating frequency, for each of those circuit regions, and ii) identify events to initiate transitions between two or more operating points for a given circuit region. The operating point controller is also configured to manage transitions between operating points for the two or more circuit regions on the integrated circuit. The operating point controller is a hardware based machine implemented in logic rather than software operating on a CPU processor.

BRIEF DESCRIPTION OF THE DRAWINGS

The multiple drawings refer to the example embodiments of the design.

FIG. 3 illustrates a diagram of an embodiment of an OPC configured to perform look ups into one or more operating point tables to provide a choice of on/off gating state selected from a group consisting of i) a clock gated state, ii) a power gated state, iii) a lower voltage retention state, iv) an operating state, and v) any combination of these four, for the two or more of the circuit regions, where this choice varies between operating points stored in the operating point tables.

FIG. 4 illustrates a diagram of an embodiment of an OPC state machine configured for all of the following, i) the identification of transition conditions to initiate operating point changes, ii) a sequencing of circuits in that circuit region required to transition between operating points, iii) a sequencing of operating voltages needed to support a corresponding operating frequency, and iv) a sending out of control signals to system resources to cause the circuits in the circuit regions to achieve a new operating point in an electrically safe manner without an undesired loss of circuit state.

FIG. 5 illustrates a diagram of an embodiment of a Voltage, Frequency, Temperature (VFT) Controller to provide temperature compensation for the operating voltage and frequency, where the VFT controller utilizes a look up table, based on the operating point of the OPC and a multi-bit temperature input, to produce proper voltage and frequency index values in accordance with a current temperature.

FIG. 6 illustrates a diagram of an embodiment of an OPC that has an operating point event selector and one or more operating point tables, where an event matrix is configured to collect incoming hardware and/or software events and distributes them to both the power domain event selector and the operating point event selector.

FIG. 7 illustrates a diagram of an embodiment of an operating point table storing multiple operating points, where a first operating point places the OPC in sole control of the gating state of that circuit region and a second operating point offers a subset of gating states for the local power domain controller to choose to be in depending on the events identified for the current conditions.

FIG. 8 illustrates a diagram of an embodiment of a register for a domain performance index being driven by either an OPC or a local power domain controller.

FIGS. 9A and 9B illustrate a circuit diagram (9A) and a table (9B) of an embodiment of the OPC having a configurable ability to have independent per-CPU gating state control.

FIG. 9C illustrate an example table of states for just the normal state without the state machine having independent per-CPU gating state control.

Figure 1:
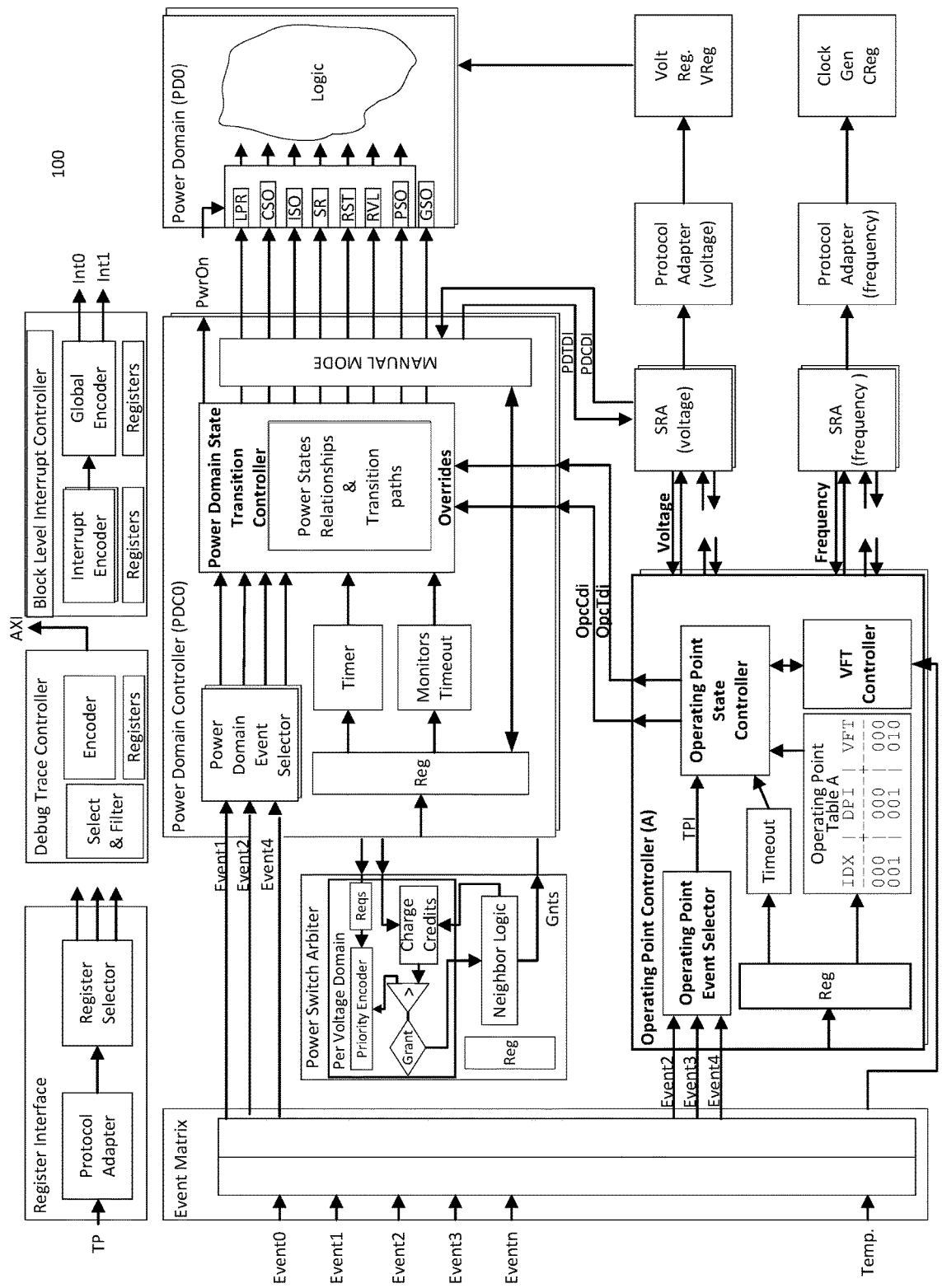
FIG. 1 illustrates a diagram of an embodiment of interaction between an OPC and various components including a power domain controller, shared resource arbiters, and other components to set on/off gating states and resource states for circuit regions in an integrated circuit.

The figures in this document illustrate diagrams of various embodiments.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific package delivery services, named components, connections, number of processors, etc., in order to provide a thorough understanding of the present design. It will be apparent; however, to one skilled in the art that the present design may be practiced without these specific details. In other instances, well known components or methods have not been described in detail but rather in a block diagram in order to avoid unnecessarily obscuring the present design. Thus, the specific details set forth are merely exemplary. The specific details discussed in one embodiment may be reasonably implemented in another embodiment. The specific details may be varied from and still be contemplated to be within the spirit and scope of the present design.

In general, an OPC for circuit regions, such as power domains, in an integrated circuit is discussed. One or more operating point controllers may manage power on an integrated circuit, such as a System on a Chip (SoC), in order to coordinate the transition of a collection of power, clock, voltage, and/or frequency domain states on the integrated circuit. The following drawings and text describe various example implementations of the design.

FIG. 1 illustrates a diagram of an embodiment of interaction between an OPC and various components including one or more power domain controllers, shared resource arbiters, and other components to set on/off gating states and resource states for circuit regions in an integrated circuit 100.

The OPC provides both i) on/off gating state and ii) different resource operating states, including different operating frequencies and corresponding voltage levels to safely operate at those different operating frequencies, in each circuit region. The different operating frequencies include at least two or more frequencies, such as 100 MHz, 500 MHz, etc., other than zero hertz because zero hertz is not an operating frequency. The OPC also manages transitions between operating points for two or more circuit regions on the integrated circuit. The OPC provides both i) setting a resource state, including operating voltage and operating frequency, for each of those circuit regions, and ii) identifying events to initiate transitions between two or more operating points for a given circuit region.

The logic of the OPC includes an operating point event selector module, an operating point state controller, and a VFT controller. The OPC includes an operating point state controller to set and manage on/off gating state for each circuit region. The OPC further includes one or more operating point tables. The operating point state controller performs look ups into the operating point tables based on the events. The operating point state controller couples to a set of one or more power domain controllers to communicate the operating point information from the operating point tables to appropriate power domain controllers connected to the OPC based on the look up. The OPC includes a VFT controller to set and manage different resource operating states including transitions between operating points for the given circuit region. The VFT controller sends required operating voltage and operating frequency information based on the operating point information to corresponding system resources, including system voltage sources and system clocks associated with particular power domains.

The logic of the OPC further includes an operating point event selector that cooperates with an event matrix. The event matrix collects incoming hardware events and distributes them to the power domain controller or operating point controller. The event matrix couples with the operating point event selector. The operating point state controller may perform look ups into the operating point table based on the events. An event comes in from the event matrix and the operating point state controller performs a look up based on events into these tables. When an event comes in from the event matrix, then the operating point event selector maps incoming events to states and this information is passed to the operating point state controller to perform the look up in the operating point table based on the events.

The OPC will send a gating state and operating points to each power domain controller it cooperates with. A power domain controller block has many smaller local domain blocks. The power domain controller contains the brains of the power manager in one central location, it orchestrates the transition of the power domains to and from a low power state. The local domain blocks follow the instructions of the power domain controller but are physically located some distance from the controller, closer to the managed power domains. The communication between the blocks is done in a timing and layout friendly manner.

Again, the OPC coordinates the transitioning of a collection of power, clock, voltage, and frequency domain states. Accordingly, the OPC communicates to a set of one or more power domain controllers including, for example, power domain-0. The power domain controller turns power on, off, raises or lower frequencies, and/or raises or lowers voltage in connected power domains. The OPC communicates the operating point information to the appropriate power controllers connected to that OPC based on the look up. The OPC coordinates the transitioning and proper sequencing for the power domains. The OPC also coordinates the transitioning of frequency and voltage in the system. The VFT controller sends the required voltage and frequency information to the system resources, such as system voltage sources and clocks associated with particular power domains. For the OPC to control the voltage resource the OPC communicates a voltage index to a shared resource arbiter. A series of voltage indexes may be defined with increasing index values resulting in increased voltage levels. The shared resource arbiter then aggregates all of its inputs from the various grains that share the same resource and determines the lowest possible working voltage. For the OPC to control the frequency domain, the OPC communicates a frequency index to a shared resource arbiter. A series of frequency indexes may be defined with increasing index values resulting in increased frequency levels. The shared resource arbiter then aggregates all of its inputs from the various grains that share the same resource and determines the lowest possible working frequency.

Thus, the operating point controller has an operating point table that stores multiple operating points for the circuit regions and an operating point state controller that accesses operating points from the operating point table. The OPC is configured to 1) use an operating point to determine both i) on/off gating state, and ii) different resource operating states, including different operating frequencies and corresponding voltage levels to safely operate at those different operating frequencies, in a given circuit region, as well as 2) manage transitions between multiple operating points for two or more circuit regions on the integrated circuit.

Note, each power domain may contain some functionality. For example, a first power domain may contain a memory, a second power domain may contain a CPU processing core, another power domain may contain all or just a portion of the communication bus interconnect for that system on a chip. In more complex power control, each power domain may contain a mixture of blocks such as memory and a portion of the communication bus interconnect.

The power domain controller is responsible for coordinating the power states of the controlled domain communicated by the operating point controller. The power domain controller also receives event inputs from the event matrix, other power domain controllers, and the software Register Interface that are decoded by the power domain state transition controller (STC) to determine the desired terminal state for the domain. The STC leverages the timer circuit to provide inter-state and power switch tap delays, plus to measure acknowledgment timeouts from attached LDBs. Optional monitors can be included to support measurements of power state switching rates and periods. The Power Domain STC is a state machine that provides control to all the remote local domain blocks (LDBs) located by the controlled power domain. The name of each state corresponds to the name of the remote block to which it talks. The state machine supports up to three low-power states, Clock Shut Off (CSO), Retention Voltage Level (RVL), and Power Shut Off (PSO); in addition to, operating state (OPR). Each operating point defines power states, including both on/off gating state and resource state, for at least two circuit regions in the integrated circuit.

The power switch arbiter implements a set of rules that prevent simultaneous power up of domains that could endanger the safe operation of domains on the same voltage supply or located physically close to the transitioning domains.

The OPC sends signals to the voltage protocol and frequency protocol adapters to provide the translation between a performance level and the actual mechanism to make the change to the resource.

Note, the OPC controls resource and gating state as well as manages transitions between operating states for two or more circuit regions. A single component provides power management of both i) on/off gating state and ii) different resource operating states, as well as then also manage transitions between operating points for each circuit region. Unifying both aspects of power management, controlling state and managing transitions, into a single apparatus, this empowers integrated circuit designers to optimize energy use with consistent and predictable results.

The OPC can be a hardware based machine implemented in logic rather than software operating on a CPU processor.

Operating Point Controller

The OPC abstracts the state for a collection of grains, where each grain may be a power domain, clock domain, voltage domain, or frequency domain. The combined state of the grains is defined as an operating point. The job of the OPC is to define the events, which lead to each of the operating points, and instructs each of the domains, voltage and frequency sources to switch to the proper value in the proper sequence at the proper time. The OPC is also responsible for determining operating points suitable for all of the associated power grains.

The VFT controller is configured i) to communicate a voltage index to a shared resource arbiter to control a voltage regulator, such as VReg, and ii) to communicate a frequency index to the shared resource arbiter to control a clock generator, such as CReg.

The VFT controller signals are communicated to voltage protocol and frequency protocol adapters to provide a translation between a performance level and an actual mechanism, the voltage regulator and/or clock generator, to make the operating voltage and operating frequency changes for the given circuit region.

Figure 2:
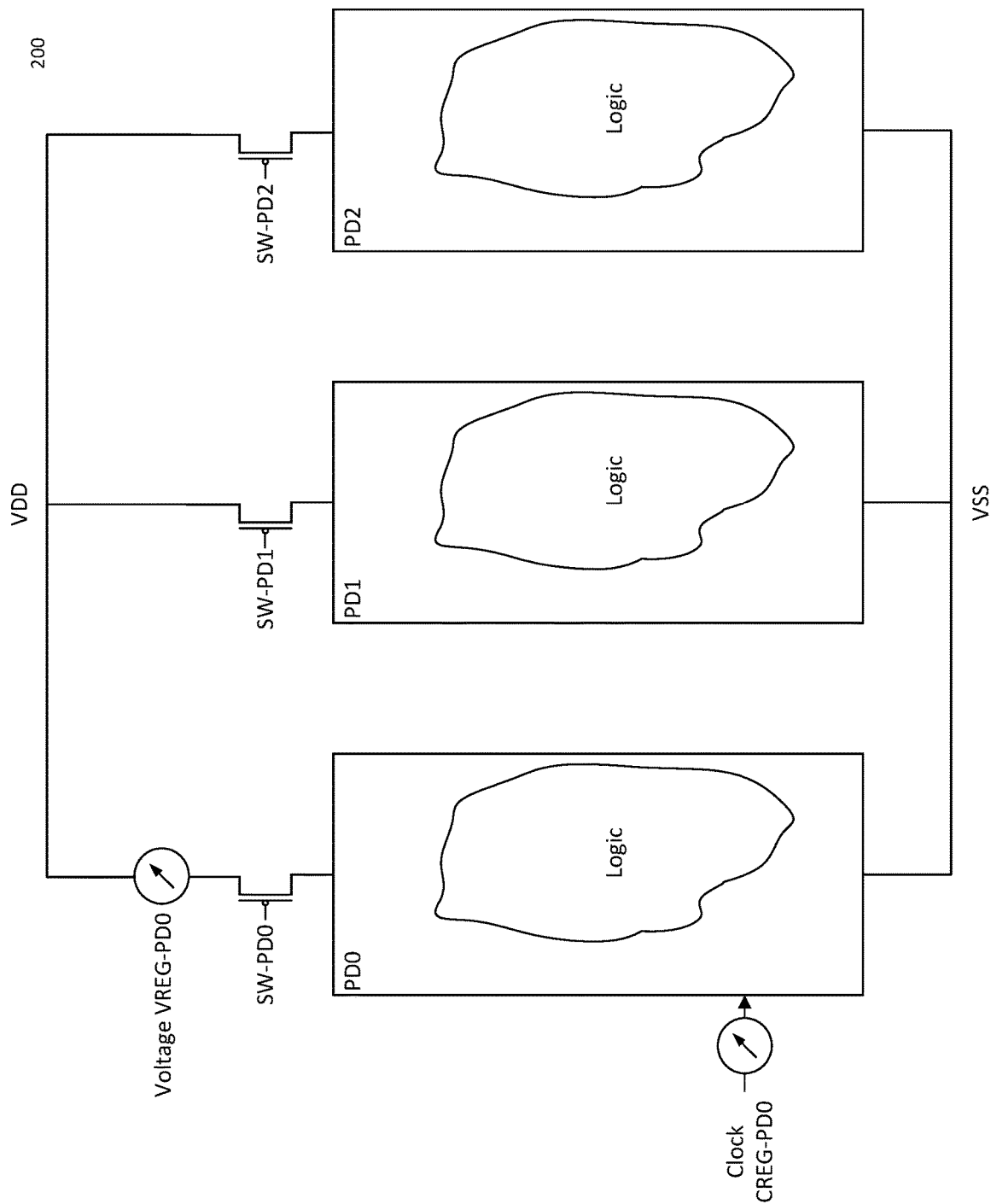
FIG. 2 illustrates a diagram of an embodiment of an OPC for two or more circuit regions in an integrated circuit that is configured to both i) set a resource state, including operating voltage and operating frequency, for each of those circuit regions, and ii) set gating states for a given circuit region, where the OPC is also configured to manage transitions between operating points for the two or more circuit regions on the integrated circuit.

FIG. 2 illustrates a diagram of an embodiment of an OPC for two or more circuit regions in an integrated circuit 200 that is configured to both i) set a resource state, including operating voltage and operating frequency, for each of those circuit regions, and ii) set gating states for a given circuit region. The OPC is also configured to manage transitions between operating points for the two or more circuit regions on the integrated circuit.

FIG. 2, given this example illustrated of three power domains, one voltage domain, and one frequency domain, the system can define a set of operating points. Power domains, PD0 consists of a power gated domain as well as regulators for a voltage domain (VREG-PD0) and clock domain (CREG-PD0. Power domains, PD1, and PD2, are merely power gated domains. The three power gated domains are each controlled by a power domain controller and support the operational states and power shut off states.

The OPC sequences a turning on of power switches for each power domain controller it controls. The OPC is configured to order this sequence of power domain controllers turned on from a compile-time static list of member power domain controllers, which will determine when a given power domain controller is allowed to turn on its power switches relative to other power domain controllers.

Power Domain Controller

The power domain controller block controls the functions of a single power domain. The control supports and operating (OPR) state and 3 low power states. The low power states are Clock Shut Off (CSO), Retention Voltage Level (RVL) and Power Shut Off (PSO). The power domain controller contains an event selector which determines when to instruct the state transition controller when to move the domain to another power state. A common timer is used for various functions such as a state delay, a state monitor and a timeout feature. The manual mode block allows for software to have direct control of the domain if this should become necessary. A set of registers ties everything together allowing software access to the features. The State Transition Controller (STC) can take in a Target Domain Index from an OPC to force the STC to move to a low power state and stay in this state (or lower state) until the OPC has removed this restriction. Also, the Power Domain Event Selector receives inputs from the overall event matrix and generates the state transitions for a single power domain.

FIG. 2 shows an example way of how on-off gating states and resource states works. As discussed, logic in OPC will change the gating state and/or resource state with OP based on incoming events. Operating point state controller sends signals to PDC state transition controller to communicate an on/off gating state for a given Power Domain. The OP state controller can also send signals to the VFT controller to change the operating points of frequency and voltage the clock regulator CReg and voltage regulator Vreg. Gate switches, SW PD0 through SW PD2, allow power gating on-off for that circuit region of the IC, such as a Power Domain PD0. The clock regulator CReg is the variable operating frequency per the current operating point. The voltage regulator Vreg is the change in operating voltage per the current operating point. The OPC will generally control the gating state but can also delegate gating state to local PDC.

The two or more circuit regions include power domains that include digital logic, such as PD 1, power domains that include analog circuits, such as PD 2, and power domains that include any combination of both digital logic and analog circuits, such as PD 0.

An example four different operating points are shown in the table of FIG. 7: a High point, a Medium point, a Low point, and an Off point. A High point has all blocks in an operating mode and PD0 running at its highest frequency −500 MHz (and thus requiring a higher voltage 1.1V). A Medium point has PD2 power gated. A Low point has both PD1 and PD2 power gated off and PD0 running at a reduced clock and voltage, such as 100 MHz and 0.8V. Finally, an Off point has all three domains power gated off.

The operating point state controller that accesses operating points from the operating point table is configured to use multiple operating points that cause the operating point state controller:

1) to determine and manage, in a first operating point, i) to transition a first circuit region to a first on/off gating state that is gated off to save power, ii) while transitioning a second circuit region to first resource state with a first operating frequency and corresponding voltage to support safe circuit operation, and
2) to determine and manage, in a second operating point, i) to transition the first circuit region to a second on/off gating state that supports an operational state for the first circuit region, ii) while transitioning the second circuit region to a second resource state with a second operating frequency and corresponding voltage to support safe circuit operation, where the second operating frequency is higher than a first operating frequency in the first operating point.

The OPC coordinates the transitioning of a collection of power, clock, voltage and frequency domain states. This can be used to implement subsystem abstraction and advanced management techniques such as dynamic voltage and frequency scaling (DVFS). The job of the OPC is to define the events, which lead to each of the operating points, and instructs each of the domains, voltage and frequency sources to switch to the proper value in the proper sequence at the proper time.

Power Domain States

A given power grain may operate in a variety of different states.

When using the power domain controller block the system can support up to four different states. These are operating (OPR) state, clock shut off state, retention voltage level state, and power shut off state. The circuit controlled by the power domain controller can only perform useful work while in the operating (OPR) state. In the other three states, the clock and/or voltage is not being applied at a level that enables correct circuit operation. However, while in the operating state, it may be desirable to change the frequency, and perhaps the voltage, to optimize the dynamic and/or static energy consumption of the power grain to match the workload. A given power grain may operate in a variety of different states.

Because the internal and/or external voltage and frequency sources to the chip are typically shared across multiple grains, the OPC is responsible for determining operating points suitable for all of the associated power grains.

Thus, the OPC is connected to system voltage and clocking resources. The OPC is configured to minimize a power and energy dissipation of the integrated circuit by managing system voltage and clocking resources connected to two or more different regions of the integrated circuit. The OPC uses configurable operating points stored in an operating table to autonomously transition the different circuit regions through a range of different states that trade off power dissipation versus responsiveness, in response to hardware and/or software events.

Note, the OPC can be implemented in software on a central processing unit, software cooperating with a microcontroller, solely in hardware, or a combination of any of these. In an embodiment, the system for the OPC is implemented in hardware logic to control the power domain controllers.

Note, two or more operating point controllers can connect to one or more shared resource arbitrators. The shared resource arbitrators are configured to arbitrate among the multiple operating point controllers (or PDCs) to determine values for the operating voltage and operating frequency to be supplied to the shared system resources.

Collection of Power, Voltage and Frequency Domains

The two or more circuit regions may include a first circuit region of the circuit regions and a second circuit region of the circuit regions, which is a larger circuit region than the first circuit region but may include the first circuit region as part of the second circuit region. For example, components from PD1 may be contained as part of the components in PD2.

Example combining power, voltage, and frequency domains together into a collection provides a means for abstracting the detailed states of each domain into a set of combined higher level set of states. These higher level states are simpler to understand and manage for the SoC designer.

An example of a cluster for a processor subsystem can be as follows. This collection contains three power domains, one adjustable voltage domain for the CPUs power domain, and one adjustable frequency domain for the CPUs power domain. Two of the power domains support two power states while the third power domain supports three power states. The combined number of possible states these three power domains plus the voltage and frequency domains could be in at any one time is forty-eight, but by defining these operating points there are only five legal states being defined.

There are three benefits from an example power state definition: State Minimization, Transition Minimization, and Domain Sequencing.

State Minimization

For example, the combined number of states for the cluster is reduced to a much smaller number than the possible states. This can reduce the verification space and thereby reduce the verification time. The physical layout and logic synthesis may also see some savings since fewer isolation and level shifter cells may be required.

Transition Minimization

The transitions between the various power states can also be reduced such that it is not allowed or possible to transition between all the states. In an example, a transition from the 'Off' state to the 'Retention' state may not be allowed. By minimizing these transitions, the system further reduces the verification space and reduces the controller complexity.

Domain Sequencing

Lastly, by defining a collection of domains the system can express the relationships between these domains not only statically within each power state but also dynamically when switching between the various states. In an example, the collection may require when switching between the 'Off' state and the 'On' state that the 'Cache Memory' and 'Cache Control' domains be powered up first before the 'CPUs'. When switching between the 'On' state and the 'MinOn' state the voltage domain may need to be switch before or after the frequency domain depending on the direction of the power state change.

Supporting Cluster Control Functions

There are a variety of supporting control functions, Power Control, Voltage Control, and Frequency Control, which are needed to enable the transition of a collection of grains between two power states.

Power Control—The control of power domains for clocks, isolation, power switching, and so on for a single power domain.

Voltage Control—The voltage control is typically done in a device via a voltage regulator. The voltage regulator interface can vary from simple input pins to more complex protocol interfaces such as APB, AHB, I2C and so on. The control of the voltage may also need to combine the requests from many different controllers to produce the overall legal voltage for the device.

Frequency Control—The frequency of clock is typically controlled in a device via a PLL or a clock generation unit. Their interfaces can vary from simple input pins to more complex protocol interfaces such as APB, AHB, I2C, and so on. The control of the frequency may also need to combine the requests from many different controllers to produce the overall legal frequency for the device.

Orchestrating Power State Changes

FIG. 4 illustrates a diagram of an embodiment of an OPC State Machine 400 configured for all of the following, i) the identification of transition conditions to initiate operating point changes, ii) a sequencing of circuits in that circuit region required to transition between operating points, iii) a sequencing of operating voltages needed to support a corresponding operating frequency, and iv) a sending out of control signals to system resources to cause the circuits in the circuit regions to achieve a new operating point in an electrically safe manner without an undesired loss of circuit state.

Orchestrating a cluster state change may require the sequencing of the various domains in a very specific order. Autonomous cluster event control is a means by which a cluster can determine when to change power states. While this is not required by a solely hardware based cluster controller for the OPC, it will further reduce the transition time to the new cluster state. This leads to independent control of the cluster state and allows for the maximum power savings. For example, the OPC may change voltage up, change frequency, change any power domain states, change voltage down in the proper sequence.

Example Operating Point Transition

Let us take a look at an operating point state change for a cluster that contains power, voltage, and frequency domains. 1. An event happens that indicates the collection of domains should move to a new operating point state. 2. First step, any voltage resources that must increase their voltage shall request the new voltage level. 3. All frequency resources are adjusted. 4. All power domains that require power down are processed. 5. All power domains that require power up are processed. 6. Loop back to step 4 if there is a required order between domains for power down and power up. 7. Any voltage resources that are reducing their voltage shall request the new voltage. This is the general mechanism that may be applied to an operating point change.

The OPC minimizes the power and energy dissipation of an integrated circuit (IC) by managing the voltage and clocking resources connected to different regions of the die. The OPC is capable of quickly and autonomously transitioning regions through a range of different states that trade off power dissipation versus responsiveness, in response to hardware and/or software events.

The OPC is configured to monitor and control power dissipation as follows:

Coarse-grained gating control to eliminate clock-related (active) power for all of the clocks associated with a circuit region.

Retention-voltage level switching to reduce the supply voltage for a circuit region to a voltage where retention of state (for example, in memories and flip-flops) is preserved, but logic operations are forbidden at the lower local supply voltage, which causes substantial leakage current to be saved.

Power shut-off, where the local supply and/or ground for a circuit region is disconnected from the global supply and/or ground, respectively; this power gating can completely eliminate leakage current-related power while the circuit is gated.

A distributed collection of configurable local controllers that manage the intermediate power sub-states that are required during transitions from operation to or from the three power states mentioned above, such as clock gating, reset control, voltage isolation and input clamping, and low power request/response interfaces for IP cores.

A centralized set of per-region domain controllers that manage the transitions between power states, using the local controllers, and based on combinations of hardware, software and/or state change events.

A flexible event matrix that synchronizes incoming hardware events and distributes them to the centralized controllers.

The OPC may have a local power management interrupt controller that generates multiple, prioritized interrupt events, allowing the OPC to request software assistance for enabled normal and exceptional conditions.

Thus, the OPC can both i) set a resource state, including operating voltage and operating frequency, for each of those circuit regions, and ii) identify events to initiate transitions between two or more operating points for a given circuit region as well as manage transitions between operating points for the two or more circuit regions on the integrated circuit.

Note, the OPC can be a hardware based machine implemented in logic rather than software operating on a CPU processor. The transition between each power state is fully controllable in hardware. The OPC implemented in hardware logic allows for faster transitions of state to occur in circuit regions than the software operating on the CPU processor, where faster transitions of state occurring in the circuit regions translates to a greater savings in battery life than slow transitions.

FIG. 3 illustrates an example detailed block diagram of an embodiment of an OPC 300 configured to perform look ups into one or more operating point tables to provide a choice of on/off gating state selected from a group consisting of i) a clock gated state, ii) a power gated state, iii) a lower voltage retention state, iv) an operating state, and v) any combination of these four, for the two or more of the circuit regions. This choice can vary between operating points stored in the operating point tables. Note, at least one operating point defines at least one circuit region to be in the operating state while at least another circuit region is in a different on/off gating state.

The OPC is configured for all of the following, i) the identification of transition conditions to initiate operating point changes, ii) a sequencing of circuits in that circuit region required to transition between operating points, iii) a sequencing of operating voltages needed to support a corresponding operating frequency, and iv) a sending out of control signals to system resources to cause the circuits in the circuit regions to achieve a new operating point in an electrically safe manner without an undesired loss of circuit state. All of these actions occur under hardware control without requesting assistance from any software operating on the CPU processor.

The OPC may have an operating point event selector module, an operating point state controller, one or more operating point tables, and a VFT controller.

Operating Point Table

The operating point table describes the state of each of the members of the operating point controller. The OPC can support up to 64 different operating points and each operating point contains a set of registers that define desired state for each member when that operating point is active. These registers may be configured as read-only or as read write if the state of a member needs to be modified at runtime. This provides the ability to define a small fixed OPC that is not runtime configurable or a very general OPC which can be modified at runtime to account for new modes of operation not known at compile time or dependent upon an operating mode of the system, such as packaging options that prevent the operation of the hardware associated with certain power domain controllers.

The OPC can cooperate with an operating point table populated with a plurality of operating points for the two or more circuit regions. The multiple operating points for one or more of the circuit regions include at least a choice between at least two different operating frequencies with associated different operating voltages. Note, the operating voltage value associated with a lower operating frequency would not provide sufficient transistor speed to allow the first circuit region to properly function at the higher operating frequency. See FIG. 7's example operating frequencies and voltages for various operating points.

The operating point state controller may perform look ups based on events into these tables. An event comes in from the event matrix and the operating point state controller performs a look up based on events into these tables.

The operating point table is split into a series of registers. A power grain's state is configured in the domain operating point table register and controlled by a power domain controller. In addition, a member operating point controller's state is also configured in the domain operating point table register. Voltage and frequency resources are configured along with the temperature in the VFT table memory and then referenced in the VFT operating point table register. This allows a single voltage, frequency, and optionally temperature specification to be referenced by many different operating points. So the operating point is used to simultaneously index both the domain operating point table and VFT operating point table to provide the desired states for each member power domain controller, OPC and the VFT table memory index. The values and information stored in these tables may be programmed in at run-time.

Referring to FIG. 1, the OPC is configured to cooperate with a programming interface that provides software-visible registers for dynamic configuration of i) generation of software and/or hardware events, ii) association of states with each operating point, iii) defining transition conditions between operating points, operating voltage and/or operating frequency associated with operating points, and iv) any combination of these. The programming interface can also cooperate with software-visible registers for dynamic configuration of the OPC generation of software events, direct control of power states and transitions, debug and monitoring of power state statistics, and interaction with the local interrupt controller.

Reset

Referring to FIG. 3, the operating point table defines which operating point is to be applied when a (PoR) occurs. This PoR operating point is automatically associated with index 0 by director and all of the member's PoR states are adjusted to match.

State Settings

FIG. 7 illustrates a diagram of an embodiment of an operating point table 700 storing multiple operating points, where one or more of the operating points are conveyed to the operating point controller, the local power domain controller, or both. A first operating point can place the OPC in sole control of the gating state of that circuit region and a second operating point can offer a subset of gating states for the local power domain controller to choose to be in depending on the events identified for the current conditions.

The system can simplify a number of operating point entries by combining OPs if the system lets, for example, PD1 and PD2 make the choice when in the High operating point to choose between a set of power domain controller states (OPR & CSO). For this example when in the High operating point PD1 and PD2 can independently choose between the Operating (OPR) and Clock shut off states (CSO).

The OPC has an ability to minimize the number of cluster states by either 1) allowing the power domain controller to choose its states or 2) defining some grain states to be "same as prior state." The current tables shows a minimized number of four cluster states, from a possible seven states, because the power domain controller was given the ability choose its states.

The domain index values for a power domain controller are encoded as one bit per each supported power state, so a bit each for OPR, Clock Shut Off, retention voltage level, and power shut off.

If the register field has a bit set to =0, the PDC is effectively removed from OPC control, the PDC event selector is passed through to the PDC state machine. Depending on the sum of the bit-wise and of the possible PDC states (TPI): the PDC can stay in a same state or transition to a higher or powered off state based on events. For example, sum==0, then PDC stays in the same state, all event selector outputs to the PDC state machine are low.

sum==1, the PDC goes to the specified state by the OPC. There are 2 exceptions here when the PDC may not change state as specified. When in PSO and the new state is RVL or CSO, the PDC will stay in PSO. When in RVL and the new state is CSO, the PDC will stay in RVL.

sum>1, the PDC goes to a state specified by the PDC selector and the possible PDC states from the OPC. If this does not produce a selection output and the PDC is not in one of the states specified by the possible PDC states from the OPC then the selector outputs OPR, PSO, RVL or CSO is forced as a selection based on the possible PDC states from the OPC. This will force a transition in all cases except when the PDC is in PSO and the new legal cases are RVL & CSO, here the PDC will stay in PSO.

The operating point table entry controlling another OPC can optionally contain a single VALID bit. This VALID bit defines if the setting for this operating point should be applied or if the previous setting for the other OPC should be maintained.

The benefit of this feature is that for some configurations fewer operating points may be needed to express the same functionality. One way this is accomplished is by simply merging two operating points that are similar except for the state of a power domain controller or operating point controller. Another is when operating points can be eliminated if external controls can be applied directly to a power domain controller and then obeyed when the current operating point does not have a valid setting or has multiple valid settings.

Referring to FIG. 1, the OPC manage at least one of i) on/off gating state and ii) different operating frequencies for each circuit region. The OPC is configured to be capable of both 1) having sole control to set and manage the on/off gating state and operating frequency for the given circuit region based on a first set of hardware and/or software events, as well as 2) delegating control to a local power domain controller to set and manage i) gating state for components in that circuit region, ii) different operating frequencies for components in that circuit region, and iii) combinations of both, based on a second set of hardware and/or software events, on a per operating point basis. The multiple operating points for that circuit region have different operating voltage levels and operating frequencies, and when delegated, the local power domain controller will chose the gating state and/or operating frequency.

The operating point table stores the multiple operating points. One or more of the operating points are conveyed to the operating point controller, the local power domain controller, or both. A first operating point places the OPC in sole control of the gating state of that circuit region. A second operating point offers a subset of gating states for the local power domain controller to choose to be in depending on the events identified for the current conditions.

The OPC has an operating point event selector and one or more operating point tables. The local power domain controller has a power domain event selector. An event matrix is configured to collect incoming hardware and/or software events and distributes them to both the power domain event selector and the operating point event selector. The operating point state controller may perform look ups into the operating point table based on the events. When an event comes in from the event matrix, then the operating point state controller performs a look up based on events into these tables and communicates the operating point to the local power domain controller.

Referring to FIG. 2, the OPC has independent control of power states for certain circuits for a first operating point for a given circuit region and the local power domain controller has its own choice of on-off gating state or choice between at least two different operating frequencies with associated voltages for that given circuit region.

The local power domain controller manages a widely varying workload by monitoring a time-averaged request workload as indicated in the events. A first user defined operating point uses dynamic voltage and frequency scaling to reduce the operating voltage and frequency when the workload is not at maximum. A second user defined operating point, at low workloads allows the local power domain controller to power gate off one or more circuits in the circuit region once the circuits reach a lower operating voltage and/or frequency. A third user defined operating point allows the local power domain controller to shut power off and/or shut off the clock to one or more circuits in the circuit region when a circuit in a circuit region becomes idle. State Machine for the operating point controller Referring to FIG. 3, the state machine that controls the OPC can be configured in many different ways but they all fall into these two categories: a Cluster Controller, and a full OPC.

Cluster Controller

The state machine when configured as a cluster controller sequences the collection of power domain controllers and OPC in the proper order. The state machine is constructed as a linear progression of states. This order ensures a safe operating point change. To start the state machine monitors a "RUN" signal and when active enables the state machine. Now it begins monitoring the incoming Target Performance Index (TPI) for any changes. Once a change is detected, the first task is to perform a table look up of the newly selected operating point. Check if the transition to the target index is allowed, if not return to the idle state. If allowed, an optional group filtering of the OPC members is performed. All power domain controllers going to a lower power state (one of CSO, retention voltage level or power shut off) are transitioned. Then based on the turn on order list, any child operating point controllers, as well as the remaining power domain controllers going to the operating state are transitioned possibly one at a time until the group is complete. Then the state machine moves to the next group. When the last group is complete, the state machine returns to the idle state, updates the current performance index and waits for the next target performance index change.

Full Operating Point Controller

The state machine for the full OPC sequences the collection of power domain controllers, operating point controller, voltage resources, and frequency resources to the proper states in the proper order. The state machine is constructed in such a way as to always ensure a safe operating point change. This includes applying any increases in voltage prior to any increases in frequency and applying any decreases in frequency before any decreases in voltage.

To start the state machine monitors a "RUN" signal and when active enables the state machine. Now the state machine begins monitoring the incoming Target Performance Index (TPI) and temperature for any changes. Once a change is detected on the TPI, the first task is to perform a table lookup of the newly selected operating point. Check if the transition to the target index is allowed, if not return to the idle state. Next, if the TPI or temperature changed the state machine looks up the voltage, frequency and temperature (VFT) index (if configured) based on the TPI and determines the start location of the table in the VFT table memory register set. Then the VFT state machine finds the proper voltage and frequency index values based on the temperature input and returns these values.

All voltage increases are now applied followed by all frequency changes, and then an optional group filtering of the OPC members is performed. All power domain controllers going to a lower power state (one of CSO, retention voltage level or power shut off) are transitioned. Then based on the turn on order list, any child operating point controllers, as well as the remaining power domain controllers going to the operating state are transitioned possibly one at a time until the group is complete. Then the state machine moves to the next group. When the last group is complete, the state machine performs any voltage reductions and return to the idle state, updating the current performance index and waits for the next target performance index or temperature change.

Again referring to FIG. 4, the flow diagram for the state machine/controller in the operating point controller considers the following. When transitioning grains there are a few corner cases that need to be covered as specified in the selector additions for the power domain controller. When a power domain controller is in power shut off and the next state is CSO and retention voltage level, the power domain controller will stay in power shut off. In addition, when the power domain controller is in retention voltage level and the next state is CSO the power domain controller will stay in retention voltage level. If this behavior is not desired, configure the state machine so that such transitions pass through an intermediate state of OPR for the power domain controller before going to the new low power state.

State Machine Optimizations

Referring back to FIG. 3, a few state machine optimizations can be made depending on the complexity of their implementation in the RTL. If the temperature changes and the resulting voltage and frequency indexes do not change then do not start the state machine. Instead of looking at the voltage and frequency index changes only look at the table entry locations, might be simpler than the previous optimization. If only the temperature changes skip the states which sequence through the power domain controller groups. Skip groups that do not contain any members.

Grouping of Power Domain Controllers and Operating Point Controllers

The OPC has an ability to have different grouping per cluster state. This ability is Run-time programmable during the manufacturing process yet still hardware-sequenced by the logic imprinted into the manufactured chip. The state machines uses registers for reprogramablity.

Sometimes it may be necessary within an operating point to completely transition a power domain controller or another OPC to a new state prior to starting the transition of another power domain controller or operating point controller. Most often, this requirement would be between two power domain controllers. This is an optional feature of the operating point controller. An example is a SoC where the interconnect may need to be fully functional at the time when a processor block is brought out of a deep sleep and begins restoring its state.

To accomplish this, each power domain controller or OPC controlled by an operating point index may contain a group number; up to 4 groups are supported and a given power domain controller or OPC can be assigned into different groups for different operating points. These group numbers act as a sequence by which the members of this group are processed through the state machine. When group 0 is complete the state machine moves to group 1 and so on until all four groups have been processed and then returns to the idle state. All domains of an OPC by default are put into group 0 and any group numbers not used may be skipped by the state machine.

Child operating point controllers belong to a single group number and the child OPC is processed in that parent operating point controller's group. When processing the child OPC the group all member of the child are sequenced through its four groups. The voltage resources and the frequency resources are not placed into a group and are processed before or after the groups based on their increase or decrease in performance.

Ordering of Power Switch Turn On

Referring to FIG. 4, the OPC has an ability to define per-cluster state ordering schemes across groups of power domain controllers. The OPC connects to power domain controllers to orchestrate, on a per state grouping, a proper sequencing for the transition of the power domains between higher and lower power states in a specific order definable by a designer of the integrated circuit into a programmable register.

An OPC can optionally sequence the turn on of power switches for each power domain controller it controls. If enabled, the power domain controller order within this sequence can be configured. This feature will allow the supply network to not be over designed to handle the worst case of possibly all domains turning on at the same time. The OPC can control this from a compile time static list of member power domain controllers and operating point controllers. The list order will determine when a power domain controller is allowed to turn on its power switches. Once a power domain controller has completed its power shut off or retention voltage level transition state the next member will be allowed to proceed to its power shut off or retention voltage level transition state. In an embodiment, this is implemented when the power domain controller reaches the OPR state. When an OPC is a member in the list it will transition all of its containing power domain controllers through the power shut off or retention voltage level state in order before returning a done signal to the containing operating point controller. If more than one target operating point state is set, then the turn on order rules will not apply and the member will transition prior to the turn on order list.

With Group Feature

If the group feature is also enabled the group order takes priority over the turn on list order. So all group 0 members that are going to a lower power state all get updated together and the controller waits for them to finish, then the member who are going to OPR transition in the order in which they are listed in the turn on ordered list, skipping the members not in group 0. Then, the system moves on to the next group and repeats. The same restriction that one domain will turn on at a time is still maintained. If more than one target operating point state is set, then the turn on order rules will not apply and the member will transition prior to the turn on order within its group.

Figure 9A:
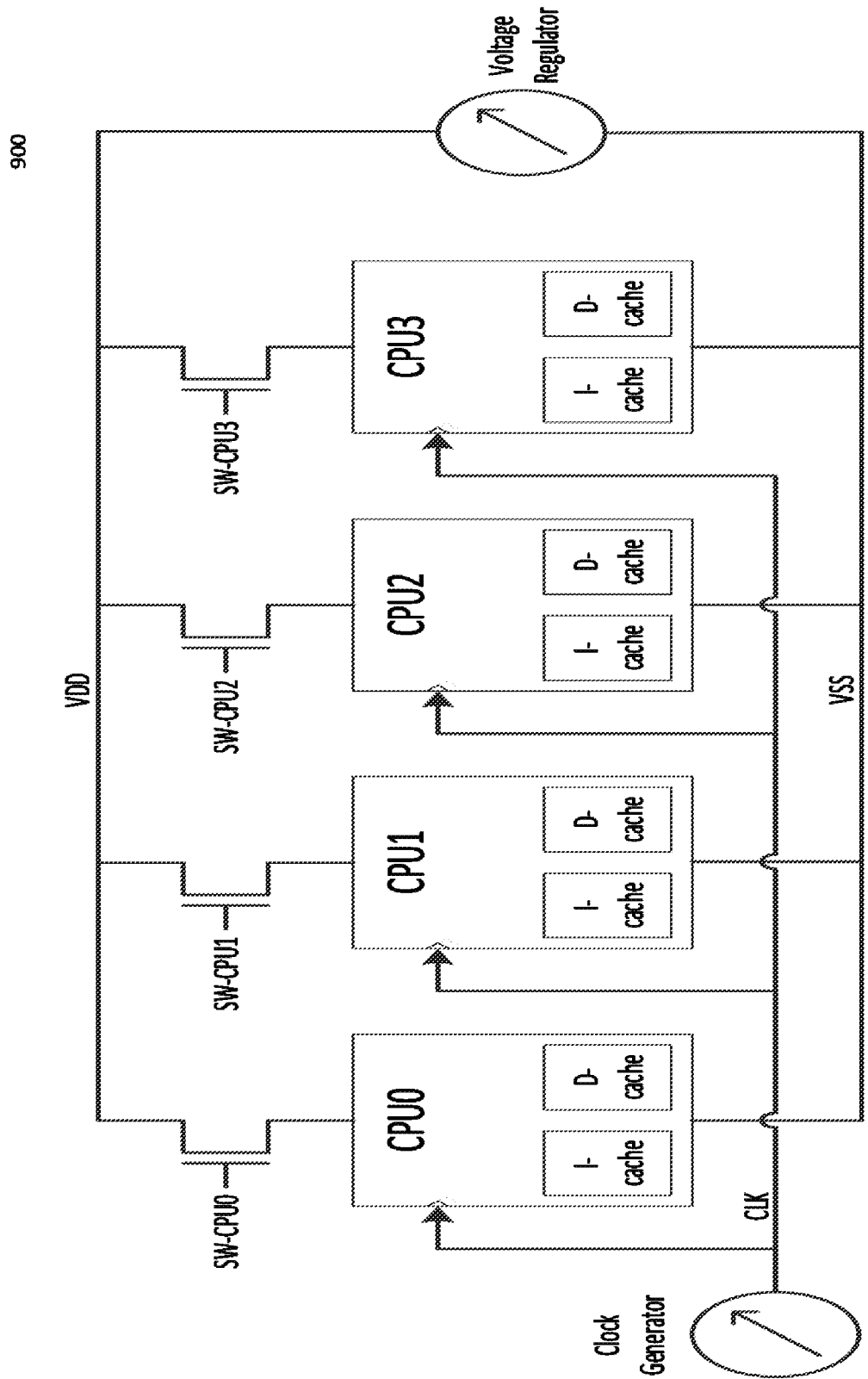

FIGS. 9A and 9B illustrate a circuit diagram (9A) 900 and a table (9B) 905 of an embodiment of the OPC having a configurable ability to have independent per-CPU gating state control. FIG. 9C illustrate an example table 910 of states for just the normal state without the state machine having independent per-CPU gating state control. The OPC state machine has different states per cluster grouping. This ability is run-time programmable during a manufacturing process. A first circuit region on the integrated circuit contains a cluster of central processing units. The operating point controller is configured to provide the same frequency and voltage to all members in the cluster; however, the operating point controller is also configured to clock and power gates off to some of the central processing units in that cluster of central processing units in that circuit region that are not currently needed by any application software via the configurable ability to have different states per cluster grouping.

The example circuit region has a CPU cluster with four CPUs, each with their own Instruction and Data caches. The operating point for each CPU supports two different gating states: operational (OPR) and power gated (PSO). Note, merely the power gating switch is shown, but other circuitry would need to be present to provide safe operation. The cluster shares a common clock source and voltage source, each of which supports 3 different values: OFF (no clock driven and VDD−VSS=0), NORM (clock at 500 MHz, VDD−VSS=1.0V), TURBO (clock at 600 MHz, VDD−VSS=1.2V).

Each CPU services tasks from a pool allocated by the operating system, running them to completion (in the OPR gating state) and then grabbing another task from the pool. The desired behavior is that each CPU will be power gated off (PSO) when it finds no tasks to run for a pre-determined interval of time. This saves energy by reducing the dynamic and static power associated with the CPU.

Conventional systems would establish an order to the CPU shutdown. Perhaps CPU3 is always shut down first, then CPU2, CPU1 and finally CPU0. This simplifies the control, but hurts performance and increases energy consumption. For instance, if CPU2 goes idle while CPU3 is running a task, the OS would need to migrate that task to CPU2 so it could shut down CPU3. Migrating the task requires loading the task's state into CPU2. While the minimum architectural state to accomplish the transfer may only be a few dozen registers, the task is likely also using instruction and data values in the CPU3 cache. Migrating the task then requires flushing dirty data from the CPU3 data cache to main memory, then when the task resumes on CPU2, none of its instructions nor data will be available in CPU2's caches, so much of this information will need to be re-loaded from main memory. These needless memory operations waste time (thus reducing performance) and energy.

If instead, the OS (or a hardware power manager) is free to individually change the gating state of each CPU, this wasted performance and energy can be re-claimed. However, managing this capability in a shared fashion results in a software and/or hardware state machine with many states. A table populated with OP in this example, would need 16 combinations of gating state resulting from independent choice for each CPU, multiplied by 2 because there are two operating frequency/voltage combination (NORM and TURBO). This resulting state machine has 33 states, and many possible state transitions among those states which complicates both design and particularly verification.

If, instead, each CPU may be independently gated when the voltage and frequency are not OFF, then the state machine may be drastically shrunk, as shown in the Table 9B to three states. This state machine is much simpler to understand, design and verify, while providing the same flexibility. Independent local control for each CPU also allows the gating transitions to occur in parallel, improving performance when powering up while saving more power when powering down. Table 9C shows the expansion of states needed for just CPU normal.

Operating Point Event Selector

Referring to FIG. 3, the operating point event selector differs from the power domain event selector in that it produces a multi-bit encoded target performance index signal instead of an individual bit for each of the terminal state. The selector will support up to a 6 bit TPI (Target Performance Index) value to correspond to the 64 different operating points and up to 6 incoming event bits. A new TPI is generated when the RUN bit is first set high or when the previous transition was successful.

FIG. 6 illustrates a diagram of an embodiment of an OPC 600 that has an operating point event selector and one or more operating point tables. An event matrix is configured to collect incoming hardware and/or software events and distributes them to both the power domain event selector and the operating point event selector.

The OPC has an operating point event selector and one or more operating point tables. The local power domain controller has a power domain event selector. An event matrix is configured to collect incoming hardware and/or software events and distributes them to both the power domain event selector and the operating point event selector. The operating point state controller may perform look ups into the operating point table based on the events. When an event comes in from the event matrix, then the operating point state controller performs a look up based on events into these tables and communicates the operating point to the local power domain controller.

The selector included inside the OPC generates the target performance index (TPI) for the state machine and as an index into the operating point tables.

The event selector may also be configured in two ways. This configuration is done at compile time. The use of event selector with either a single equation or different sets of equations allows customizable mapping of input event changes to go to different cluster states: Single selector below or Selector per Operating Point below.

Single Selector

The selectors may be configured is to use the same event selector registers, and thus a single set of equations, for all current operating points along with a valid register to help the selector ignore event combinations.

Selector Per Operating Point

The second way the selectors may be configured is to use a different set of event selector registers, and thus a different set of equations, based on the current operating point. This gives a very flexible implementation at the cost of some additional register space.

Voltage, Frequency and Temperature Controller

FIG. 5 illustrates a diagram of an embodiment of a VFT Controller 500 to provide temperature compensation for the operating voltage and frequency, where the VFT controller utilizes a look up table, based on the operating point of the OPC and a multi-bit temperature input, to produce proper voltage and frequency index values in accordance with a current temperature.

The OPC has a combined grain state control and voltage and/or frequency response compared to a tracked temperature of the system. The "system state", as defined in the hardware logic of the frequency, voltage, temperature controller, includes per-grain power state plus one or more voltage and frequency levels. An OPC may contain up to four VFT controllers. Each VFT controller provides a look up mechanism based on the operating point of the OPC and a multi-bit temperature input to produce the proper voltage and frequency index values. The VFT controller must reevaluate the resulting resource index values each time the target index or temperature input changes when the OPC state controller is in an idle state.

The OPC has a VFT controller to provide temperature compensation for the operating voltage and frequency. The VFT controller utilizes a look up table, based on the operating point of the OPC and a multi-bit temperature input, to produce proper voltage and frequency index values in accordance with a current temperature.

The OPC has a VFT controller to cooperate with an operating point table to facilitate sharing the VFT entries among multiple operating points. The operating point table contains a pointer into a VFT table memory for each operating-point-controller operating point, where more than one operating point entry can use the same pointer value.

The VFT controller in the OPC sets an operating voltage and/or frequency response compared to a tracked temperature of the integrated circuit. The OPC converts 1) a desired performance index and/or 2) a current tracked temperature into the operating voltage/frequency required to implement that performance index, and dynamically during operation, change the operating voltage and/or frequency response to match that performance index.

The VFT controller may operate on a different multi-bit temperature input. Also, More than one VFT controller can generate an index value for the same resource within the same operating point controller. The resolution of multiple index values for the same resource is handled downstream by the shared resource arbiter. Each temperature input is synchronized to the EPU clock as a group within the event matrix block.

For systems that optimize the voltage and frequency based on process monitors in addition to temperature, one can either change the VFT table memory entries based upon the measured process corner, or change the VFT table memory pointers stored in the VFT operating point table. The first method is efficient when the VFT table memory is reprogrammable for other reasons (perhaps to allow tighter design/characterization margin). The second method involves having multiple VFT table memory sections for each process corner, which is efficient when the VFT table memory will be read-only.

VFT Tables

The example shows an OPC that contains 6 operating points (Boot, T1, T2, S1, S2 & S3). The VFT operating point table contains a pointer into the VFT table memory for each OPC operating point. More than one operating point entry may use the same pointer value. The VFT table memory is where the actual mapping tables are contained for temperature to voltage and frequency. The example shows three tables. Each table must be in decreasing temperature order with the temperature of the last row in the table always being zero.

The first table in the VFT table memory starts and ends at pointer value 0. This is a simple entry that always runs VP0 at 1.1 v and FP0 at 100 MHz. The next table starts at pointer value 1 and in interpreted as follows; if the temperature is greater than to equal to 50, then run VP0 at 1.1 v and FP0 at 300 Mhz, else if the temperature is greater than to equal to 30, then run VP0 at 1.1 v and FP0 at 400 Mhz, else if the temperature is greater than to equal to 0, then run VP0 at 1.1 v and FP0 at 500 Mhz. The last table starts at pointer value 4 and in interpreted as follows; if the temperature is greater than to equal to 40, then run VP0 at 1.1 v and FP0 at 300 Mhz, else if the temperature is greater than to equal to 20, then run VP0 at 1.0 v and FP0 at 300 Mhz, else if the temperature is greater than to equal to 0, then run VP0 at 0.9 and FP0 at 300 Mhz.

Small voltage and frequency vs. temperature tables can be assigned to multiple grain operating points. For example, T1 and T2 in FIG. 5 point to the same row of conditions in the hardware table. Also, the hardware-implemented table may be organized as a list of sorted temperatures. This makes for a very easy look up and comparison function.

VFT Temperature Hysteresis

The temperature hysteresis option is configured per VFT controller and utilizes a register value stored in sign magnitude format to configure the amount of hysteresis to apply. Thus, the OPC has a hysteresis lag set so that when increasing or decreasing in temperature of the system the controller must receive a signal from a sensor that the set point for the temperature to change operating points is exceeded by a set number of degrees before swapping operating points. This prevents rapidly changing operating points in a cyclic manner when the temperature of the system is near the temperature set point.

Let us look at the example shown in FIG. 5 with a hysteresis value of positive 5 for operating point T1. A starting temperature of 60 will select a frequency of 300 Mhz, when the temperature drops below 50 but above 29 the frequency selected will be 400 Mhz. Say the temperature drops to 40, so the selected frequency is 400 Mhz. Now if the temperature would need to rise to 55 in order for the frequency to drop again back to 300 Mhz.

If the system takes the same example but change the hysteresis value to negative 5 for operating point T1. A starting temperature of 60 will select a frequency of 300 MHz, when the temperature drops below 45 but above 24, the frequency selected will be 400 MHz. Say the temperature drops to 40, so the selected frequency is 400 MHz. Now if the temperature would need to rise to 50 in order for the frequency to drop again back to 300 MHz.

Details for an Example Implementation

There is a simple flow to follow to implement the hysteresis function. the system will have two variables Srow (start row) and Mrow(last matched row) which both reset to 0. Vrow(temporary variable row). The Hysteresis, HysP and HysN are sign magnitude numbers, all other variables are unsigned. When a VFT lookup is needed, the following tasks are perform in this order:

1. if Hysteresis > 0 then HysP = Hysteresis else HysP = 0
2. if Hysteresis < 0 then HysN = Hysteresis else HysN = 0
3. If the StartPointer from the OPC lookup not equal to Srow then
   a. Mrow = 0
4. Vrow = Srow = StartPointer
5. if Vrow < Mrow then
   a. if InputTemp >= (Table Temp + HysP) then
      i. Select this row; Mrow=Vrow; exit
6. else
   a. if InputTemp >= (Table Temp + HysN) then
      i. Select this row; Mrow=Vrow; exit
7. end if
8. Vrow++
9. Loop back to #5

Reprogramming Behavior

To reprogram the OPC during operation a user must follow these steps. Set the control register bit "RUN" and wait until the OPC is Idle. Now the operating point table and selector registers may be reprogrammed.

Once reprogrammed the new target performance index can be set via the MANUAL register. Once set a REFRESH operation can be initialed via the MANUAL register the state controller will transition all the members to their new state as defined by the new target performance index via the operating point table. Once this transition is complete, back in the IDLE state, the system can now set the RUN bit in the CONTROL register to re-enable the operating point controller.

When a hierarchy of operating point controllers is configured, it will be necessary to clear the RUN bit on the Top OPC controller first and wait for all the transitions to complete (IDLE state), before clearing the lower OPC's RUN bits. To re-enable the OPC, the lowest level OCP's should be enabled first followed by the next level up to the top.

Registers

The registers of the OPC block. All registers are defined a 64 bits in width.

Two or more operating point controllers may be instantiated in systems with a large amount of power domain controllers. A hierarchy may exist between the operating point controllers. The hierarchy of operating point controllers gives the ability to cascade cluster controllers to implement larger clusters.

The OPC coordinates the transitioning of a collection of power grains through user defined states. This can be used to implement power state abstraction. Optionally, the target power domain index value is provided from an operating point controller. For example, the State Transition Controller (STC) in the power domain controller can take in a Target Domain Index from an OPC to force the STC to move to a low power state and stay in this state (or lower state) until the OPC has removed this restriction. This feature will allow an OPC to change a power domain to a Clock shut off, Rvl, or Pso state. This will allow the OPC to define an operating point that includes power domains that may not yet in a low power state.

FIG. 8 illustrates a diagram of an embodiment of a register for a domain performance index 800 being driven by either an OPC or a local power domain controller. The OPC current domain operating point register contains values including multiple bit values. This register contains the current domain performance index values being driven by the power domain controllers or operating point controllers. These values may be read at any time. These are domain indexes so they have up to a 2 bit value for a PDC (encoded per state PSO(3), RVL(2), CSO(1), OPR(0)) or up to an 7 bit value for another OPC. How the delegation to PDC by the OPC is implemented in an example. DPI tells the state the PDC is allowed to go into. This register can have values mapped to other tables and registers so multiple resources can use similar values and settings.

Simulation and Modeling

Figure 10:
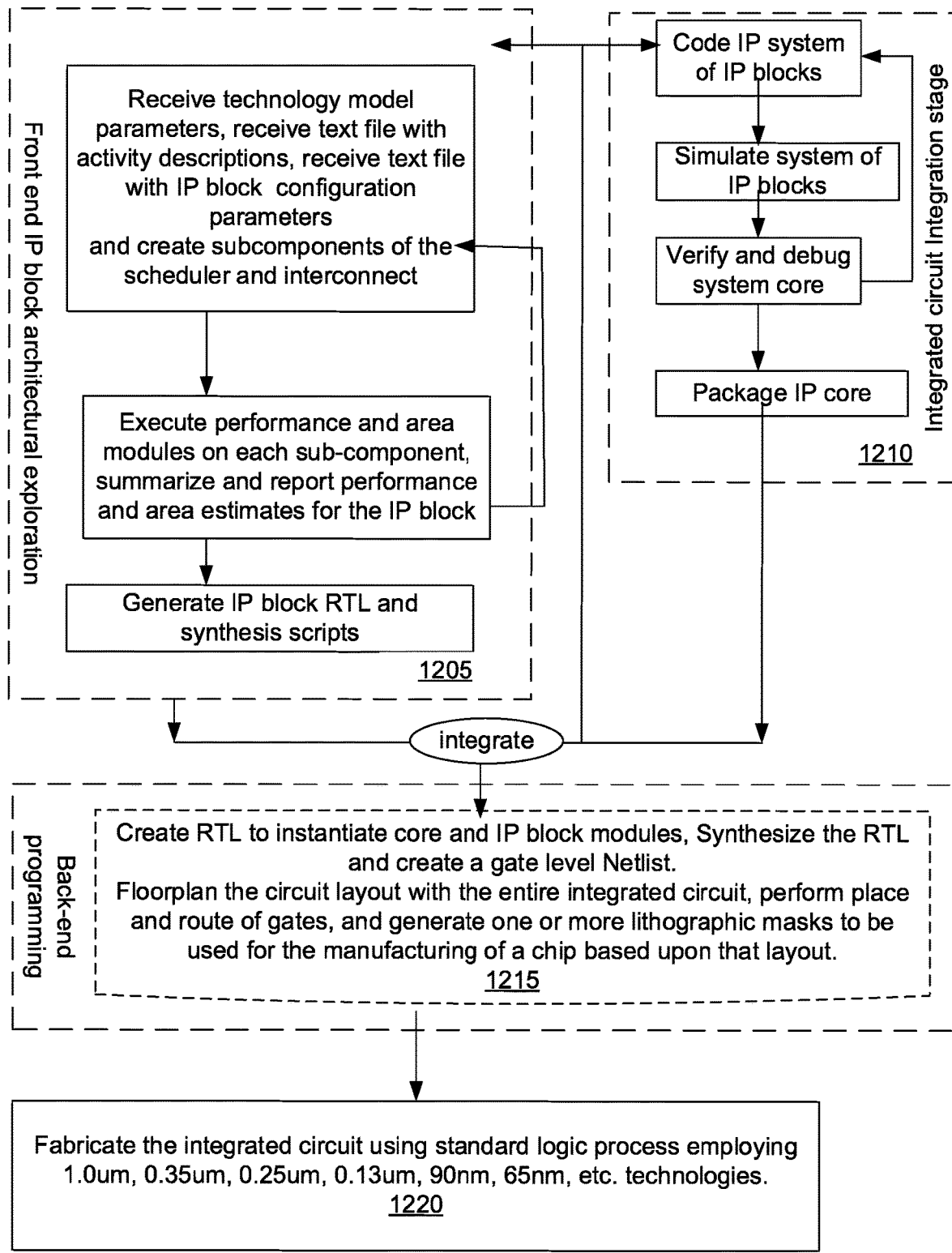
FIG. 10 illustrates a flow diagram of an embodiment of an example of a process for generating a device, such as an integrated circuit, with one or more operating point controllers, in accordance with the systems and methods described herein.

FIG. 10 illustrates a flow diagram of an embodiment of an example of a process for generating a device, such as an integrated circuit, with one or more operating point controllers, in accordance with the systems and methods described herein. The example process for generating a device with designs of the Interconnect may utilize an electronic circuit design generator, such as a System on a Chip compiler, to form part of an Electronic Design Automation (EDA) toolset. Hardware logic, coded software, and a combination of both may be used to implement the following design process steps using an embodiment of the EDA toolset. The EDA toolset such may be a single tool or a compilation of two or more discrete tools. The information representing the apparatuses and/or methods for the circuitry discussed herein may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses, or model representations of the apparatuses such as simulations and lithographic masks, and/or methods described herein.

Additionally, an Electronic Design Automation Development tool for the OPC produces key deliverables like IEEE-1801 UPF output files that streamline the integration of the IP into the customer design while ensuring both control protocol and electrical consistency and correctness throughout the implementation flow. Finally, the OPC offers rich support for in-system software to monitor activity, tune power management priorities, and even override the hardware machines whenever desired.

Generation of the RTL and UPF views of the configured Power Management subsystem, together with a UVM-based verification test bench and automatic, configuration-dependent stimulus definition of linked subsystems composed of multiple domain controllers, with hardware coordination of coupled state transitions based on shared events.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium. The machine-readable medium may have data and instructions stored thereon, which, when executed by a machine, cause the machine to generate a representation of the physical components described above. This machine-readable medium stores an Electronic Design Automation (EDA) toolset used in a System-on-a-Chip design process, and the tools have the data and instructions to generate the representation of these components to instantiate, verify, simulate, and do other functions for this design.

Generally, the EDA toolset is used in two major stages of SOC design: front-end processing and back-end programming. The EDA toolset can include one or more of a RTL generator, logic synthesis scripts, a full verification testbench, and SystemC models.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 1205, the EDA tool set may receive a user-supplied text file having data describing configuration parameters and a design for at least part of a tag logic configured to concurrently perform per-thread and per-tag memory access scheduling within a thread and across multiple threads. The data may include one or more configuration parameters for that IP block. The IP block description may be an overall functionality of that IP block such as an Interconnect, memory scheduler, etc. The configuration parameters for the Interconnect IP block and scheduler may include parameters as described previously.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 1210, a separate design path in an ASIC or SoC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations, such as software coded models, to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 1215, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 1220, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCP to display socket activity, OCPPerf2 to analyze performance of a bundle, as well as other similar programs.

As discussed, an EDA tool set may be implemented in software as a set of data and instructions, such as an instance in a software library callable to other programs or an EDA tool set consisting of an executable program with the software cell library in one program, stored on a machine-readable medium. A machine-readable storage medium may include any mechanism that stores information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. However, a machine-readable storage medium does not include transitory signals. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. For example, the encoding and decoding of the messages to and from the CDF may be performed in hardware, software or a combination of both hardware and software. It has proven convenient at times, principally for reasons of common usage, to refer to these signals as bits, values, elements, symbols, characters, terms, numbers, or the like. While some specific embodiments of the invention have been shown the invention is not to be limited to these embodiments. The invention is to be understood as not limited by the specific embodiments described herein, but only by scope of the appended claims.

The invention claimed is:

1. An apparatus, comprising:
 an operating point controller configured to:
   i) manage transitions between multiple operating points for one or more circuit regions in an integrated circuit,
   ii) change a resource state, including operating voltage and operating frequency, for at least a first circuit region of the one or more circuit regions, wherein the resource state is determined by a currently selected operating point from the multiple operating points for the first circuit region, and
   iii) identify events to initiate transitions between the multiple operating points for the first circuit region,
  wherein the operating point controller is implemented in hardware logic that identifies the events and manages transitions between the multiple operating points, including changing resource states, and wherein the hardware logic comprises:
   an operating point state controller;
   a voltage, frequency, and temperature controller configured to provide temperature compensation for the operating voltage and the operating frequency of the first circuit region of the one or more circuit regions; and
   one or more operating point tables populated with a plurality of operating points for the one or more circuit regions.

2. The apparatus of claim 1, wherein the operating point state controller is configured to perform look ups into the one or more operating point tables based on the events; and
 wherein the voltage, frequency, and temperature controller is configured to send required operating voltage and operating frequency information based on operating point information from the one or more operating point tables to corresponding system resources, including system voltage sources and system clocks associated with particular power domains.

3. The apparatus of claim 1, wherein the apparatus further comprises an event matrix,
 wherein the hardware logic of the operating point controller further includes an operating point event selector that is configured to cooperate with the event matrix, and wherein the operating point event selector maps incoming events from the event matrix to states and communicates the states to the operating point state controller to perform look ups into the one or more operating point tables based on the events.

4. The apparatus of claim 1, wherein the voltage, frequency, and temperature controller is in communication with a voltage protocol adaptor and a frequency protocol adapter to provide a translation between a performance level and an actual mechanism to make the operating voltage and operating frequency changes for the first circuit region, and wherein the voltage protocol adaptor and the frequency protocol adapter communicate to the actual mechanism via a native interface supplied by a voltage regulator and/or a clock generator.

5. The apparatus of claim 1, wherein the operating point controller is configured to cooperate with the one or more operating point tables populated with the plurality of operating points for the one or more circuit regions, where multiple operating points for a first circuit region of the one or more circuit regions include at least a choice between at least two different operating frequencies with associated different operating voltages, and wherein an operating voltage value associated with a lower operating frequency does not provide sufficient transistor speed to allow the first circuit region to function at the higher operating frequency.

6. The apparatus of claim 1, wherein the operating point controller is configured to:
   i) identify transition conditions to initiate operating point changes;
   ii) identify a sequencing of circuits in the one or more circuit region required to transition between operating points;
   iii) identify a sequencing of operating voltages needed to support a corresponding operating frequency; and
   iv) send out control signals to system resources to cause the circuits in the one or more circuit regions to achieve a new operating point in an electrically safe manner without an undesired loss of circuit state,
   wherein all of these actions occur under hardware control in the operating point controller without requesting assistance from any software operating on a central processing unit (CPU) processor.

7. The apparatus of claim 1, wherein transitions of state occur faster in ther one or more circuit regions when the operating point controller is implemented in hardware logic than transitions of state implemented by the operating point controller using software operating on a CPU processor, and wherein faster transitions of state occurring in the one or more circuit regions translates to a greater savings in battery life than slow transitions.

8. The apparatus of claim 1, wherein the operating point controller connects to power domain controllers to orchestrate, on a per state grouping, a sequencing for the transition of the power domains between higher and lower power states in a specific order definable by a designer of the integrated circuit into a programmable register.

9. The apparatus of claim 1, wherein two or more operating point controllers connect to one or more shared resource arbitrators, and wherein the one or more shared resource arbitrators are configured to arbitrate among the two or more operating point controllers to determine values for the operating voltage and operating frequency to be supplied to shared system resources.

10. The apparatus of claim 8, wherein the operating point controller is configured to sequence a turning on of power switches for each power domain controller it controls, wherein the operating point controller is configured to order the sequence of power domain controllers turned on from a compile-time static list of member power domain controllers, which determines when a given power domain controller is allowed to turn on its power switches relative to other power domain controllers.

11. A non-transitory machine-readable medium having data and instructions stored thereon, which, when executed by a machine, cause the machine to generate a representation of the apparatus of claim 1, wherein the machine-readable medium stores an Electronic Design Automation (EDA) toolset used in a System-on-a-Chip design process that has the data and instructions to generate the representations of the apparatus.

12. An method, comprising:
   configuring an operating point controller to manage transitions between multiple operating points for one or more circuit regions in an integrated circuit;
   configuring the operating point controller to:
      i) change a resource state, including operating voltage and operating frequency, for at least a first circuit region of the one or more circuit regions, wherein the resource state is determined by a currently selected operating point from the multiple operating points for the first circuit region; and
      ii) identify events to initiate transitions between the multiple operating points for the first circuit region,
   wherein the operating point controller is implemented in hardware logic that identifies the events and manages transitions between the multiple operating points, including changing resource states, without requiring any software to operate on any central processor unit (CPU) processor, and wherein the hardware logic comprises:
      an operating point state controller;
      a voltage, frequency, and temperature controller configured to provide temperature compensation for the operating voltage and the operating frequency of the first circuit region of the one or more circuit regions; and
      one or more operating point tables populated with the multiple operating points for the one or more circuit regions.

13. An operating point controller produced from the process of claim 12.

14. The method of claim 12, the method further comprising:
   configuring the operating point state controller to perform look ups into the one or more operating point tables based on the events, wherein the operating point state controller couples to a set of one or more power domain controllers to communicate operating point information from the one or more operating point tables to the one or more power domain controllers connected to the operating point controller based on the look up; and
   configuring the voltage, frequency, and temperature controller in the operating point controller to send required operating voltage and operating frequency information based on the operating point information to corresponding system resources, including system voltage sources and system clocks associated with one or more power domains.

15. The method of claim 14, the method further comprising:
   configuring the voltage, frequency, and temperature controller in the operating point controller to communicate with a voltage protocol adaptor and a frequency protocol adapter to provide a translation between a performance level and an actual mechanism to make the operating voltage and operating frequency changes for the first circuit region, wherein the voltage protocol adaptor and the frequency protocol adapter communicate to the actual mechanism via a native interface supplied by a voltage regulator and/or a clock generator.

16. The method of claim 12, the method further comprising:
   configuring the operating point controller to cooperate with the one or more operating point tables populated with the multiple operating points for the one or more circuit regions, wherein multiple operating points for the first circuit region include at least a choice between at least two different operating frequencies with associated different operating voltages, and wherein an operating voltage value associated with a lower operating frequency does not provide sufficient transistor speed to allow the first circuit region to function at the higher operating frequency.

17. The method of claim 12, the method further comprising:
configuring the operating point controller to:
i) identify transition conditions to initiate operating point changes;
ii) identify a sequencing of circuits in the one or more circuit regions required to transition between operating points;
iii) identify a sequencing of operating voltages needed to support a corresponding operating frequency; and
iv) send out control signals to system resources to cause the circuits in the one or more circuit regions to achieve a new operating point in an electrically safe manner without an undesired loss of circuit state,
wherein all of these actions occur under hardware control in the operating point controller without requesting assistance from any software operating on the CPU processor.

18. The method of claim 12, the method further comprising:
configuring the operating point controller to connect to power domain controllers to orchestrate, on a per state grouping, a sequencing for the transition of the power domains between higher and lower power states in a specific order definable by a designer of the integrated circuit into a programmable register.

19. The method of claim 12, the method further comprising:
configuring two or more operating point controllers to connect to one or more shared resource arbitrators, wherein the one or more shared resource arbitrators are configured to arbitrate among the two or more operating point controllers to determine values for the operating voltage and operating frequency to be supplied to shared system resources.

20. The method of claim 18, the method further comprising:
configuring the operating point controller to sequence a turning on of power switches for each power domain controller it controls, wherein the operating point controller is configured to order the sequence of power domain controllers turned on from a compile-time static list of member power domain controllers, which determines when a given power domain controller is allowed to turn on its power switches relative to other power domain controllers.

* * * * *